United States Patent [19]

Antonets et al.

[11] 3,982,275

[45] Sept. 21, 1976

[54] READ-WRITE APPARATUS FOR USE IN A CONVEYOR CONTROL

[76] Inventors: Ivan Vasilievich Antonets, ulitsa Kirova, 8, kv. 21; Igor Kasianovich Mlynchik, ulitsa Polbina, 55, kv. 47; Alexandr Pavlovich Panov, proezd Polbina, 32, kv. 119, all of Ulyanovsk, U.S.S.R.

[22] Filed: May 27, 1975

[21] Appl. No.: 581,416

[52] U.S. Cl. .................................................. 360/1
[51] Int. Cl.² .......................................... G11B 5/00
[58] Field of Search ................... 360/1; 235/61.11 D

[56] References Cited
UNITED STATES PATENTS

| | | | |
|---|---|---|---|
| 2,857,059 | 10/1958 | Goerlich et al. | 360/1 |
| 2,955,277 | 10/1960 | Shelton | 360/1 |
| 3,219,989 | 11/1965 | Kuhrt et al. | 360/1 |
| 3,307,162 | 2/1967 | Fink | 360/1 |
| 3,368,208 | 2/1968 | Lippmann et al. | 360/1 |
| 3,432,747 | 3/1969 | Quittner | 360/1 |
| 3,579,265 | 5/1971 | Mandzsu et al. | 235/61.11 D |
| 3,587,856 | 6/1971 | Lemelson | 360/1 |
| 3,706,027 | 12/1972 | Grice et al. | 235/61.11 D |
| 3,911,252 | 10/1975 | Meyer | 235/61.11 D |

*Primary Examiner*—Robert S. Tupper
*Attorney, Agent, or Firm*—Haseltine, Lake & Waters

[57] ABSTRACT

According to the invention, the conveyor control device, comprising an information carrier in the form of permanent magnets pressed into a nonmagnetic backing, and an information recording unit wherein pole pieces of a magnetic core are located on a common yoke with magnetizing coils. The opposite poles of the pole pieces are directed towards each other. In the process of recording the information carrier is introduced into a pole gap in the core. The information reading unit incorporates a nonlinear excitation circuit used to deliver current pulses to input electrodes of a magnetic field pickup, a decoder in the form of a diode bridge, a unit compensating for the magnetic field of the earth, a voltage source, and an output unit.

3 Claims, 6 Drawing Figures

READ-WRITE APPARATUS FOR USE IN A CONVEYOR CONTROL

The present invention relates to automatic control systems of continuous transportation and more specifically it relates to a conveyor control device, and to its read-write apparatus.

The present invention can be of use for controlling the transportation of piece loads by overhead load-carrying and pushing conveyors, monorails, floor-mounted conveyors and transporters and for controlling the rail traffic.

Of late, the known electromagnetic conveyor control devices comprising an information carrier, an information recording unit and an information reading unit are commonly provided with magnetic information carriers. Said carriers provide a simple and reliable means of recording information and its noncontact readout. The magnetic information carrier has determined the selection of a reading element sensitive to the magnetic field. The reading elements are made in the form of sealed magnetic-controlled contacts (hercons), inductance coils, Hall pickups, magnetic doides and magnetic resistors.

In elaborating such devices the basic problem lies in increasing the gap between the interacting units, simultaneously increasing their sensitivity and noise stability. Known in the art is a conveyor control device comprising an information carrier, an information recording unit and an information reading unit. The information carrier is made up of permanent magnets spaced at a certain distance along the body of the information carrier. The information recording unit is constituted by an electromagnet while the information reading unit is made in the form of a permanent magnet suspended from a spring.

The permanent magnet of the information carrier passes in the immediate proximity to the pole of the electromagnet of the information recording units, the winding of said electromagnet carrying the current pulses. The magnetic field of the electromagnet magnetizes the permanent magnet of the information carrier in accordance with the magnitude and polarity of the current pulses passing at a given moment through the electromagnet winding. While information is being read out, the magnetic field of the permanent magnet of the information carrier interacts with the field of the permanent magnet of the information reading unit, said magnet being suspended from a spring. The permanent magnet of the information reading unit deflects in the direction determined by the magnetization polarity of the information carrier and closes the corresponding contacts of the output unit.

Another known conveyor control device comprises an information carrier moved along the conveyor track, an information recording unit and an information reading unit, both located on the conveyor track. The information carrier body made of a nonmagnetic material carries the information-storing permanent magnets spaced at a certain distance from one another. The information recording unit consists of a predetermined number of V-shaped magnetic cores. The yoke of each magnetic core carries magnetizing coils. The information reading unit comprises a magnetic field pickup, a decoder of heteropolar pulses, a voltage source and an output unit. The magnetic field pickup is constituted by a Hall pickup whose input electrodes are connected via series resistors with the voltage source. The output electrodes of the Hall pickup are connected with the decoder of heteropolar pulses which consists of phase-sensitive multistage amplifiers connected to the output unit.

Information is recorded while the information carrier passes close to the magnetic cores of the information recoding unit in which case the magnetizing coils are supplied with half-wave current. The created magnetic field magnetizes the permanent magnets of the information carrier. The residual fields of the permanent magnets carry the preset information. As the information carrier passes by the information reading unit, its magnetic field acts on the Hall pickup. When current is supplied to the input electrodes of the Mall pick up, an electromotive force is generated on the output electrodes, said force acting as an output signal. Then the signal is delivered to the input of the amplifiers which are sensitive to the polarity of the input signals, and further to the output unit.

The known devices require a minimum gap between the interacting units. The permanent magnets of the information carrier have no clearly defined magnetization axis and their magnetic fluxes are distributed in space practically uniformly; as a result, the information carrier is subjected to the influence of external magnetic fields. The design of the information recording unit denies the possibility of directing the entire magnetic flux through the magnetic care to the working gap so that there are large stray fields. Making the permanent magnets from materials with a large coercive force and capable of storing information reliably is impracticable on account of a considerable increase in the magnetizing force a large proportion of which is spent on the stray fields. A direct connection of the magnetic field pickup to the voltage source limits the amplitude of the supply current (due to overheating of the pickup) and, as a consequence, the amplitude of the output signal of the magnetic field pickup, thus requiring a multistage amplification of the output signal.

The above disadvantages reduce noise stability, reliability and sensitivity.

It is an object of the invention to provide a read-write apparatus for a conveyor control device, which increases the gap between the interactig units, improve sensitivity and noise stability, and reduces the effect of external magnetic fields.

The essence of the invention lies in providing an apparatus for conveyor control device located on the conveyor track, comprising an information carrier moved along the track, to record and store information and made in the form of permanent magnets pressed into a nonmagnetic backing and spaced at a certain distance from one another. There is an information recording unit to record information on the information carrier, comprising magnetizing coils secured on a magnetic core whose gap contains magnetic lines of force and which consists of a yoke and pole pieces located in the immediate proximity to the information carrier moved along the conveyor track.

Furthermore there is an information reading unit located on the conveyor track and comprising a magnetic field pickup which serves to determine the magnitude and direction of the magnetic field built up by the information carrier moved along the conveyor track; a decoder of heteropolar pulses dividing the signals of opposite polarity, whose input is connected with output electrodes of the magnetic field pickup, an output unit to generate a signal and connected with the decoder of heteropolar pulses, and a source of voltage interacting with the magnetic field pickup.

According to the invention the magnetizing axes of the permanent magnets in the information carrier are parallel to the magnetic lines of force in the gap of the information recording unit, whose magnetic core yoke is common for all the pole pieces, spaced in pairs at a distance from one another and carrying the magnetizing coils, the opposite poles of each pair of the pole pieces being directed towards each other; the information carrier moved along the conveyor track is located between the pole pieces.

The information reading unit incorporates a nonlinear excitation circuit which shortens the durability of current pulses on the input electrodes of the magnetic field pickup and produces sufficiently strong pulses on its output electrodes for the operation of the output unit whose input is connected to the voltage source, and its output to one of the input electrodes of the magnetic field pickup. The decoder is made in the form of a diode bridge connecting the output electrodes of the magnetic field pickup with the output unit.

It is recommended that the information reading unit incorporates a unit compensating for the magnetic field of the earth, connected in parallel with the magnetic field pickup.

It is preferable that the magnetic field pickup has additionally two output electrodes, each connected to the output unit via a diode.

The conveyor-control read-write apparatus provides for recording, storing and reading information by a noncontact method with a high sensitivity and noise stability.

Now the invention will be described in detail by way of a preferred example with reference to the accompanying drawings in which.

Figure 1:
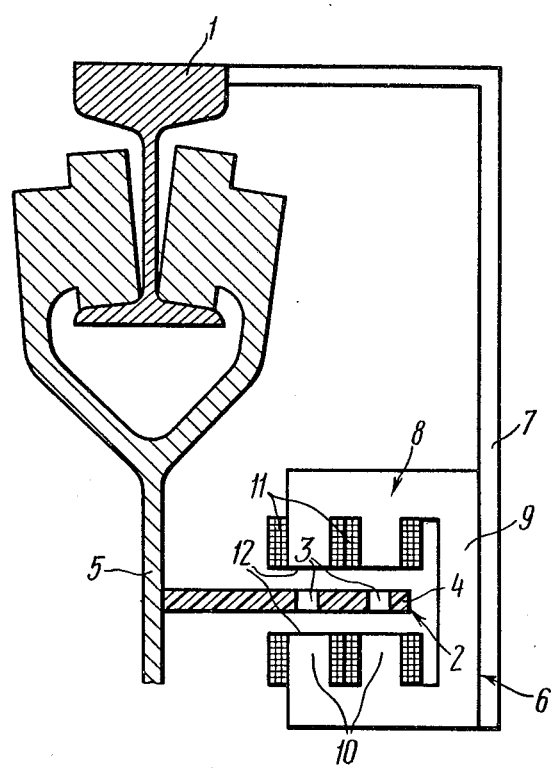
FIG. 1 shows the relative positions of an information carrier and an information recording unit according to the invention.

The conveyor control device located on a conveyor track 1 (FIG. 1), including the inventive read-write apparatus, comprises an information carrier 2 in the form of permanent magnets 3 pressed into a nonmagnetic backing 4. The information carrier 2 is secured to an object 5 moved along the conveyor track 1 (the conveyor is not shown in the drawing).

The apparatus of the conveyor control device comprises also an information recording unit 6 located on the conveyor track with the aid of a bracket 7. The information recording unit 6 comprises a magnetic core 8 consisting of a common yoke 9 and of pairs of pole pieces 10 spaced at a certain distance from one another The core 8 has a pair of substantially parallel limb portions, as shown in FIG. 1, defining a gap therebetween. In the exemplary embodiment of the present invention two pairs of pole pieces 10 are shown. Each pair of pole pieces 10 carries magnetizing coils 11. The opposite poles 12 of each pair of the pole pieces are directed towards each other.

Figure 2:
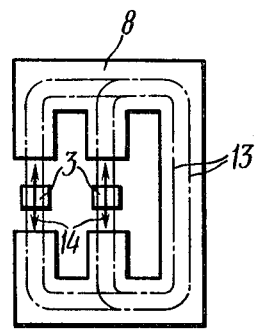
FIG. 2 shows the distribution of magnetic lines of force in a gap of the magnetic core of an information recording unit and of the magnetizing axes of permanent magnets of the information carrier according to the invention.

FIG. 2 shows the pattern of magnetic lines of force 13 of the magnetic coil 8 and of the magnetizing axes 14 of the permanent magnets 3.

Figure 3:
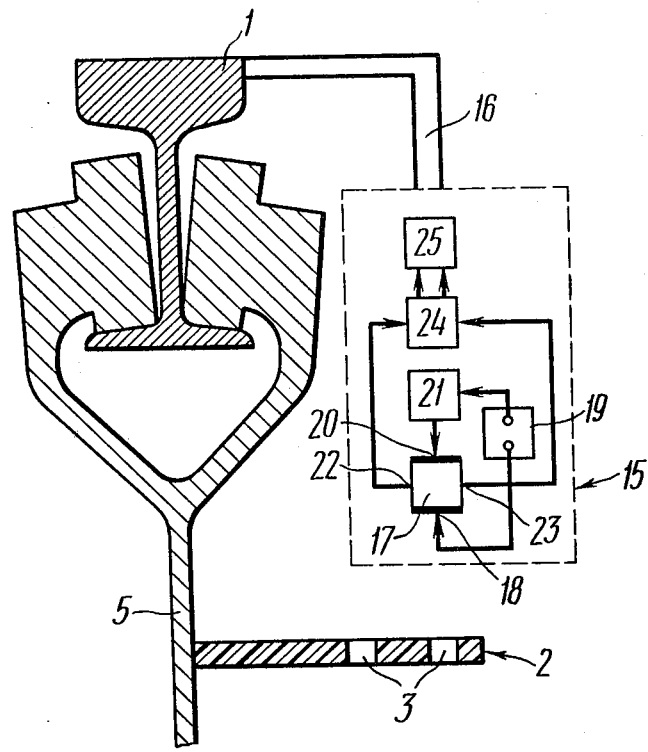
FIG. 3 shows the relative positions of the information carrier and an information reading unit according to the invention.

The apparatus of the conveyor control device also comprises an information reading unit 15 (FIG. 3) mounted on the conveyor track 1 with the aid of a bracket 16. The information reading unit 15 incorporates a magnetic field pickup, one input electrode 18 of which is connected to a source 19 of alternating voltage. Another input electrode 20 of the magnetic field pickup 17 is connected to a nonlinear excitation circuit 21 which, in turn, is connected to the same voltage source 19. Output electrodes 22 and 23 of the magnetic field pickup 17 are connected to a decoder 24 of heteropolar pulses which is connected with an output unit 25.

Figure 4:
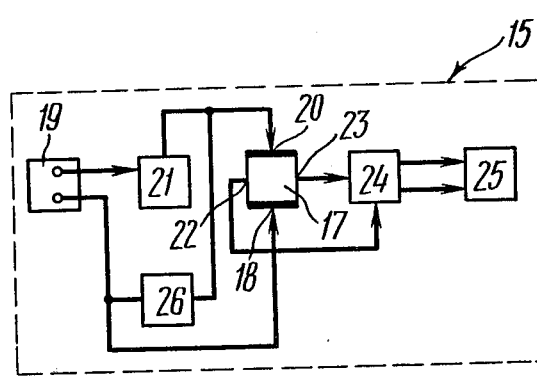
FIG. 4 is a block diagram of the information reading unit according to the invention.

The information reading unit 15 comprises a unit 26 (FIG. 4) compensating for the magnetic field of the earth, connected with the nonlinear excitation circuit 21, in parallel with the magnetic field pickup 17.

Figure 5:
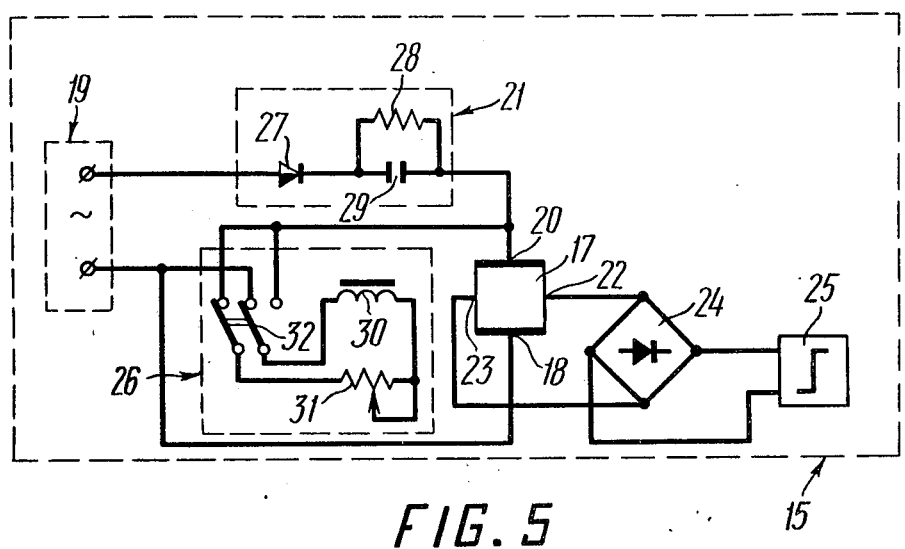
FIG. 5 is an elementary circuit diagram of the information reading unit according to the invention.

Shown in FIG. 5 is an elementary circuit diagram of the information reading unit 15 whose magnetic field pickup 17 is constituted by a so-called Hall pickup. The input electrode 18 of the magnetic field pickup 17 is connected to the voltge source 19. The other input electrode 20 of the magnetic field pickup 17 is connected to the nonlinear excitation circuit 21 which consists of a series-connected controllable doide 27 and a parallel circuit comprising a resistor 28 and a capacitance 29.

The output electrodes 22 and 23 of the magnetic field pickup 17 are connected to the decoder 24 of heteropolar pulses made in the form of a diode bridge which is connected with the relay output unit 25 set for a certain operating level. The unit 26 compensating for the magnetic field of the earth connected with the nonlinear excitation circuit 21 parallel with the magnetic field pickup 17 comprises an inductance coil 30, a variable resistor 31 and a switch 32.

Figure 6:
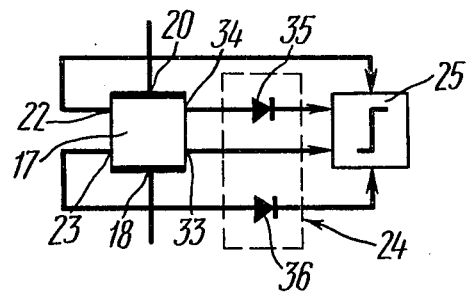
FIG. 6 shows a version of a magnetic field pickup according to the invention.

FIG. 6 shows a version of the magnetic field pickup 17 with two additional output electrodes 33 and 34 and of the decoder 24 of heteropolar pulses made in the form of two diodes 35 and 36 through which the output electrodes 33 and 34 of the magnetic field pickup 17 are connected to the output unit 25.

The conveyor control device starts functioning at the moment when new information is recorded on the information carrier 2 (FIG. 1). The information is recorded while the information carrier 2 passes through the gap of the magnetic core 8 of the information recording unit 6. The information is coded in the ternary system, using three states of the permanent magnet 3 of the information carrier 2, viz., the states of negative and positive magnetization and a nonmagnetized state.

The permanent magnets 3 are magnetized as follows. The magnetizing coils 11 carry a half-wave current fed from an external source (not shown in the Fig.). The magnitude and direction of the magnetic flux generated in the gap of the magnetic core 8 depend on the magnitude and polarity of the current pulses. The magnetic flux acts upon the permanent magnets 3 of the information carrier and changes their magnetic states.

The magnetic field is distributed in such a manner that the magnetic lines of force 13 (FIG. 2) in the magnetic core 8 are parallel to the magnetizing axes 14 of the permanent magnets 3. The magnetic state created in the course of recording is retained in the permanent magnets 3 owing to residual magnetism even after they have passed through the gap of the magnetic core 8.

Demagnetizing occurs when an alternating current is supplied to the corresponding magnetizing coils 11 (FIG. 1). In this case the permanent magnet 3 located in the gap between these coils is acted upon by the magnetic field which decreases in the direction of movement of the information carrier 2.

Thus, after the information carrier 2 has passed through the gap in the magnetic core 8 the process of information recording ends and the residual fields of the premanent magnets 3 carry the preset information in certain combinations. The number of such combinations can be derived from the formula $N = 3^n - 1$ (1) where $n$ = number of the permanent magnets 3 in the information carrier 2; and 3 = number of states of the permanent magnet 3.

The information is read out while the information carrier 2 (FIG. 3) moves along the conveyor track past the information reading unit 15. This unit starts operating at the moment when alternating voltage begins to be fed from the voltage source 19 (FIG. 5) to the non-linear excitation circuit 21. As a result, voltage on the controllable diode 27 grows and the diode becomes conducting when the voltage level rises to the cutting-in voltage level. The current pulse passes through the series-connected controllable diode 27 and the parallel circuit of resistor 28 and — capacitance 29, and through the magnetic field pickup 17.

At the moment of opening of the controllable diode 27 the amplitude of this current pulse is governed only by the internal resistance of the magnetic field pickup 17 and the direct resistance of the controllable diode 27 since at this moment the resistance of the capacitance 29 is close to zero. Later on, the pulse magnitude of the current decreases due to a sharp increase in the resistance of the capacitance 29 which is charged and, as the current grows to the cutting-off level, closes the controllable diode 27. Then the capacitance 29 is discharged through the resistor 28.

The parameters of the nonlinear excitation circuit 21 are selected so that the controllable diode 27 operates once in every positive half-period of the alternating voltage source 19. During the negative half-period the control lable diode 27 is closed. Thus the input pair of electrodes 18 and 20 of the magnetic field pickup is supplied with a current pulse whose amplitude is several times greater than that used when the magnetic field pickup 17 is connected directly to the alternating voltage source 19. An increase in the amplitude of the supply current raises the sensitivity of the magnetic field pickup without changing the temperature conditions of its operation.

The magnetic field pickup 17 is constituted by the Hall pickup with two pairs of electrodes. The input pair of electrodes 18 and 20 is used to supply the pickup 17 with a current pulse produced with the aid of the nonlinear excitation circuit 21. When the magnetic field of the information carrier 2 (FIG. 3) acts on the Hall pickup 17, this produces an electromotive force on its pair of output electrodes 22 and 23, the magnitude and polarity of said electromotive force depending on the magnitude and direction of the magnetic field of the information carrier.

The output signal flows from the Hall pickup 17 to the decoder 24 of heteropolar pulses which divides the signals of the opposite polarity between the corresponding channels. These signals are delivered to the relay output unit 19 which operates at a certain level and polarity of the signal, the polarity determining the setting of the information reading unit 15. The introduced nonlinear excitation circuit 21 makes it possible to increase the pulse amplitude on the input electrodes 18 and 20 of the Hall pickup 17 and produce the pulses on its output electrodes 22 and 23, said pulses being sufficient for the operation of the output unit 25.

Simultaneously, the current pulses flow from the non-linear excitation circuit 21 to the unit 26 (FIG. 5) which compensates for the magnetic field of the earth and is connected in parallel with the Hall pickup 17. The current pulse flows through the circuit switch 32 — variable resistor 31—inductance coil 30 — switch 32. The variable resistor 31 sets the magnitude of the current pulse supplying the inductance coil 30 and the switch 32 sets its direction. The magnetic flux built up by the inductance coil 30 makes up for the magnetic field of the earth or the magnetic fields created by the remote external sources and influencing the Hall pickup 17. This improves the stability of its characteristics and increases the noise stability of the information reading unit 15.

The use of the magnetic field pickup 17 (FIG. 6) with two additional output electrodes 33 and 34 has simplified the decoder 24 of heteropolar pulses. In this case the output signals pass from the corresponding output electrodes 22, 23, 33, 34 through the diodes 35 and 36 of the decoder 24 of heteropolar pulses to the relay output unit 25. As a result, the direct resistance of the decoder 24 of heteropolar pulses has been decreased, thereby increasing the sensitivity of the information reading unit 15 (FIG. 5).

The read-write apparatus for the conveyor control device considered above provides for recording, storing and reading information by a noncontact method with large gaps between the interacting units and is distinguished by high sensitivity and noise stability.

What we claim is:

1. A read-write apparatus for use in a conveyor control device located on the track of the conveyor, the apparatus comprising (1) a carrier having a non-magnetic backing and serving for information recording, storage and playback during its movement along the track; permanent magnets pressed into said backing and spaced at preset distances; (2) a unit for recording the information, including a magnetic core to concentrate magnetic flux in a gap formed between a pair of substantially parallel limb portions of the latter, and having pole pieces spaced in pairs at preset distances, on opposite sides of said carrier, and having opposite poles that are directed towards each other; coils located on said pole pieces for magnetizing said core, to generate an electric signal that builds up the flux in said core; a yoke for said core, common for said pole pieces; (3) a unit located on said track for reading the information, including a magnetic-field pickup for determining the magnitude and direction of the magnetic field built up by said carrier during its movement along the track; input and output electrodes in said pickup; a non-linear excitation circuit in said reading unit for increasing the amplitude of the current pulses on said input electrodes, the input of said excitation circuit being connected with said voltage source, while its output is connected to one of said input electrodes; (4) voltage source means for at least one of said recording and said reading units; (5) a decoder of heteropolar pulses in said reading unit for separating signals of opposite polarities; and (6) an output unit, also in said reading unit, for generating a signal; said decoder being made in the form of a diode bridge which connects said output electrodes with said output unit.

2. The apparatus as defined in claim 1, further comprising a unit connected in parallel with said pickup for compensating the magnetic field of the earth.

3. The apparatus as defined in claim 1, wherein said reading unit further includes two diodes and two additional output electrodes for said pickup, said additional electrodes being connected with one of said diodes, and said diodes being connected with said output unit.

* * * * *